(12) United States Patent
Lee et al.

(10) Patent No.: US 10,469,911 B2
(45) Date of Patent: Nov. 5, 2019

(54) DISPLAY APPARATUS AND METHOD FOR PROVIDING CHANNEL LIST THEREOF

(71) Applicant: SAMSUNG ELECTRONICS CO., LTD., Suwon-si, Gyeonggi-do (KR)

(72) Inventors: Bong-seok Lee, Suwon-si (KR); Je-youn Dong, Suwon-si (KR); Do-sung Kim, Hwaseong-si (KR); In-jee Song, Seoul (KR); Seung-min Shin, Seoul (KR); Hee-ran Lee, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 15/667,892

(22) Filed: Aug. 3, 2017

(65) Prior Publication Data
US 2018/0041811 A1    Feb. 8, 2018

(30) Foreign Application Priority Data
Aug. 5, 2016  (KR) .................. 10-2016-0100087

(51) Int. Cl.
*H04N 21/482*  (2011.01)
*H04N 21/431*  (2011.01)
(Continued)

(52) U.S. Cl.
CPC ....... *H04N 21/482* (2013.01); *H04N 21/4314* (2013.01); *H04N 21/4383* (2013.01);
(Continued)

(58) Field of Classification Search
CPC .......... H04N 21/482; H04N 21/44222; H04N 21/4532; H04N 21/4826; H04N 21/8456;
(Continued)

(56) References Cited

U.S. PATENT DOCUMENTS 8,024,756 B2   9/2011  Friedlander et al.
8,549,561 B2  10/2013  Yeh et al.
(Continued)

FOREIGN PATENT DOCUMENTS

JP   2001-275048   10/2001
JP   2007-060398    3/2007
(Continued)

*Primary Examiner* — Kunal Langhnoja
(74) *Attorney, Agent, or Firm* — Nixon & Vanderhye P.C.

(57) ABSTRACT

A display apparatus is provided. The display apparatus according to an example embodiment includes a display configured to display a broadcast program, a storage configured to store a viewing history information regarding broadcasting programs viewed through the display apparatus, and a processor configured to determine a channel analysis model from among a plurality of channel analysis models based on a viewing history information related to a time when a predetermined event occurs in the display apparatus, to generate a channel list through the determined channel analysis model and to display the channel list on the display, and the channel list includes information regarding a broadcast program which is expected to be viewed at a time when a predetermined event occurs in the display apparatus. Accordingly, a channel list for broadcast programs which are expected to be viewed at a time when a predetermined event occurs in the display apparatus is provided and thus, the user may easily reproduce a desired broadcast program.

18 Claims, 11 Drawing Sheets

(51) Int. Cl.
  *H04N 21/438* (2011.01)
  *H04N 21/44* (2011.01)
  *H04N 21/442* (2011.01)
  *H04N 21/45* (2011.01)
  *H04N 21/845* (2011.01)

(52) U.S. Cl.
  CPC . *H04N 21/44008* (2013.01); *H04N 21/44222* (2013.01); *H04N 21/4532* (2013.01); *H04N 21/4826* (2013.01); *H04N 21/8456* (2013.01)

(58) Field of Classification Search
  CPC ......... H04N 21/4314; H04N 21/44008; H04N 21/4383
  See application file for complete search history.

(56) References Cited

U.S. PATENT DOCUMENTS

| | | |
|---|---|---|
| 9,106,956 B2 | 8/2015 | Chun et al. |
| 2002/0056098 A1* | 5/2002 | White .................... H04N 5/44 725/39 |
| 2003/0018972 A1* | 1/2003 | Arora .................... H04H 60/65 725/47 |
| 2008/0222680 A1 | 9/2008 | Murakami |
| 2017/0148027 A1* | 5/2017 | Yu ....................... G06Q 20/4016 |

FOREIGN PATENT DOCUMENTS

| | | |
|---|---|---|
| KR | 2000-0051975 | 8/2000 |
| KR | 10-2009-0075264 | 7/2009 |
| KR | 10-1268133 | 5/2013 |

\* cited by examiner

DISPLAY APPARATUS AND METHOD FOR PROVIDING CHANNEL LIST THEREOF

CROSS-REFERENCE TO RELATED APPLICATION

This application is based on and claims priority under 35 U.S.C. § 119 to Korean Patent Application No. 10-2016-0100087, filed on Aug. 5, 2016, in the Korean Intellectual Property Office, the disclosure of which is incorporated by reference herein in its entirety.

BACKGROUND

1. Field

The present disclosure relates generally to a display apparatus and a method for providing a channel list using the same, and for example, to a display apparatus which provides a channel list for broadcasting programs and a method for providing a channel list using the same.

2. Description of Related Art

With the development of electronic technology, users can watch various programs through digital TV. However, as there are too many channels provided, in order to view a broadcast program that a user wishes to watch, the user needs to switch channels several times, which causes inconvenience.

In order to solve such a problem, a digital TV service providing a recent channel list is provided. However, such a service generally provides a list of channels defined by a user or channels most recently viewed.

According to this, the list of the channel defined by the user or the channel most recently viewed is uniformly provided, so that the user may not be provided with a channel that he or she wishes to watch at the time of turning on the TV. Therefore, the user is not able to utilize such a service efficiently, and there is still an inconvenience in searching for a broadcast program to be viewed through a plurality of channel switching operations.

Accordingly, a method for providing a channel list for broadcast programs more effectively is required.

SUMMARY

An aspect of the example embodiments relates to providing a channel list for broadcasting programs which are expected to be viewed by a user at a time when a predetermined event occurs in a display apparatus.

According to an example embodiment, a display apparatus is provided including a display configured to display a broadcast program, a storage configured to store a viewing history information regarding broadcasting programs viewed by a user through the display apparatus, and a processor configured to determine a channel analysis model among a plurality of channel analysis models based on a viewing history information related to a time when a predetermined event occurs in the display apparatus, to generate a channel list through the determined channel analysis model, and to display the channel list on the display, wherein the channel list includes information regarding a broadcast program which is expected to be viewed by the user at a time when a predetermined event occurs in the display apparatus.

The processor may calculate (determine) accuracy of each of the plurality of channel analysis models using viewing history information related to a time when a predetermined event occurs in the display apparatus, and determine a channel analysis model having highest accuracy calculated among the plurality of channel analysis models as a channel analysis model for generating the channel list.

The processor may calculate (determine) accuracy based on a degree of matching between a channel list proposed by the channel analysis model before the predetermined event occurs in the display apparatus and a channel list proposed by the channel analysis model at a time when the predetermined event occurs in the display apparatus.

The plurality of channel analysis models may include a Most Recently Use (MRU) model which determines a broadcast program most recently viewed by the user with reference to a time when a predetermined event occurs in the display apparatus, a Most Frequently Use (MFU) model which determines a broadcast program most frequently viewed by the user with reference to a time when a predetermined event occurs in the display apparatus, a DATE model which determines a broadcast program viewed by the user on at least one of a time, a day and a time and a day corresponding to a time when a predetermined event occurs in the display apparatus, and a MIX model consisting of at least two of the MRU model, the MFU model and the DATE model.

The MRU model may propose a channel list in which channels determined to be most recently viewed broadcast programs are listed sequentially, the MFU model may propose a channel list in which channels determined to be most frequently viewed broadcast programs are listed sequentially, the DATE model may propose a channel list which is generated by applying a day rule weight, a time rule weight and a day and time rule weight to channels determined to be viewed by the user at least one of a time, a day and a time and a day corresponding to a time when a predetermined event occurs in the display apparatus and listing the channels in descending order of weights, and the MIX model may propose a channel list consisting of at least two models among the MRU model, the MFU model and the DATE model.

The processor, in response to an input (e.g., user input) for channel switch being received, may update the viewing history information based on the input, determine the channel analysis model again based on the updated viewing history information, and update the channel list based on the re-determined channel analysis model.

The processor may display information regarding a channel analysis model used for generating the channel list through the display.

The time at which the predetermined event occurs may include at least one of a time when the display apparatus is turned on and a time when a channel of the display apparatus is switched.

The processor, in response to an input (e.g., user input) for selecting a broadcast program which is displayed on the channel list being received, may perform channel switch to a channel which provides the selected broadcast program.

According to an example embodiment, a method for providing a channel list of a display apparatus is provided including determining a channel analysis model among a plurality of channel analysis models based on a viewing history information related to a time when a predetermined event occurs in the display apparatus, generating a channel list through the determined channel analysis model and displaying the channel list on the display, wherein the channel list includes information regarding a broadcast program which is expected to be viewed by the user at a time when a predetermined event occurs in the display apparatus.

The determining a channel analysis model may further include calculating (determining) accuracy of each of the plurality of channel analysis models using viewing history information related to a time when a predetermined event occurs in the display apparatus and determining a channel analysis model having highest accuracy calculated among the plurality of channel analysis models as a channel analysis model for generating the channel list.

The calculating accuracy may include calculating (determining) accuracy based on a degree of matching between a channel list proposed by the channel analysis model before the predetermined event occurs in the display apparatus and a channel list proposed by the channel analysis model at a time when the predetermined event occurs in the display apparatus.

The plurality of channel analysis models may include a Most Recently Use (MRU) model which determines a broadcast program most recently viewed by the user with reference to a time when a predetermined event occurs in the display apparatus, a Most Frequently Use (MFU) model which determines a broadcast program most frequently viewed by the user with reference to a time when a predetermined event occurs in the display apparatus, a DATE model which determines a broadcast program viewed by the user on at least one of a time, a day and a time and a day corresponding to a time when a predetermined event occurs in the display apparatus, and a MIX model consisting of at least two of the MRU model, the MFU model and the DATE model.

The MRU model may propose a channel list in which channels determined to be most recently viewed broadcast programs are listed sequentially, the MFU model may propose a channel list in which channels determined to be most frequently viewed broadcast programs are listed sequentially, the DATE model may propose a channel list which is generated by applying a day rule weight, a time rule weight and a day and time rule weight to channels determined to be viewed by the user at least one of a time, a day and a time and a day corresponding to a time when a predetermined event occurs in the display apparatus and listing the channels in descending order of weights, and the MIX model may propose a channel list consisting of at least two models among the MRU model, the MFU model and the DATE model.

The method may further include, in response to an input (e.g., user input) for channel switch being received, updating the viewing history information based on the user input, determining the channel analysis model again based on the updated viewing history information, and updating the channel list based on the re-determined channel analysis model.

The displaying may further include displaying information regarding a channel analysis model used for generating the channel list through the display.

The time at which the predetermined event occurs may include at least one of a time when the display apparatus is turned on and a time when a channel of the display apparatus is switched.

The method may further include, in response to an input (e.g., user input) for selecting a broadcast program which is displayed on the channel list being received, performing channel switch to a channel which provides the selected broadcast program.

According to the above-described various example embodiments, a channel list for broadcast programs which are expected to be viewed by a user at a time when a predetermined event occurs in the display apparatus is provided and thus, the user may be provided with a more effective channel list.

BRIEF DESCRIPTION OF THE DRAWINGS

The above and/or other aspects, features and attendant advantages of the present disclosure will be more apparent from the following detailed description, taken in conjunction with the accompanying drawings, in which like reference numerals refer to like elements, and wherein.

DETAILED DESCRIPTION

The terms used in the present disclosure and the claims are general terms selected in consideration of the functions of the various example embodiments of the present disclosure. However, these terms may vary depending on intention, legal or technical interpretation, emergence of new technologies, and the like of those skilled in the related art. Further, some of the terms may be ones arbitrarily selected. Unless there is a specific definition of a term, the term may be understood based on the overall contents and technological common sense of those skilled in the related art.

In describing example embodiments, detailed description of relevant known functions or components may be omitted if it would obscure the description of the subject matter.

The terms used in the present application are merely used to describe the example embodiments, and are not intended to limit the scope of the disclosure. The singular expression also includes the plural meaning as long as it does not conflict with the context. In the present disclosure, the terms "include" and "consist of" designate the presence of features, numbers, steps, operations, components, elements, or a combination thereof that are written in the disclosure, but do not exclude the presence or possibility of addition of one or more other features, numbers, steps, operations, components, elements, or a combination thereof.

In the example embodiment of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Hereinafter, the present disclosure will be described in greater detail with reference to the accompanying drawings.

The example embodiments of the present disclosure will be described in detail with reference to the following drawings and features in the enclosed drawings, but the features of the present disclosure are not limited thereto.

Hereinafter, a display apparatus and a method for providing a channel list using the same according to an example embodiment will be described in greater detail with reference to the drawings attached hereto.

Figure 1:
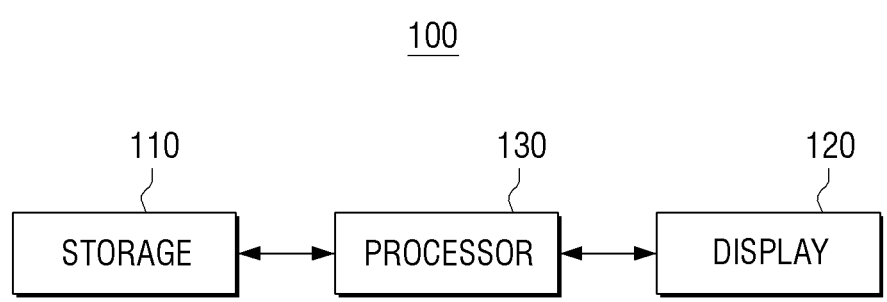
FIG. 1 is a block diagram illustrating an example configuration of a display apparatus according to an example embodiment.

FIG. 1 is a block diagram illustrating an example configuration of a display apparatus according to an example embodiment.

As illustrated in FIG. 1, a display apparatus 100 includes a storage 110, a display 120 and a processor (e.g., including processing circuitry) 130.

The storage 110 stores viewing history information regarding broadcast programs viewed by a user.

Here, the viewing history information may include a channel, a viewing time and a viewing count of a plurality of broadcast programs viewed by the user through the display apparatus 100.

The storage 110 stores a plurality of channel analysis models used for generating a channel list.

Here, the channel analysis models are models which determine viewing history information related to a point of time when a predetermined event occurs among viewing history information of a user and propose a channel list based on the determination, and may include Most Recently Use (MRU) model, Most Frequently Use (MFU) model, DATE model, MIX model, etc. The specific functions of the channel analysis models will be described in greater detail below.

Meanwhile, the storage 110 may be implemented as various types of recording media. For example, the storage 110 may be implemented as a non-volatile memory element such as Read Only Memory (ROM), Programmable Read Only Memory (PROM), Erasable Programmable Read Only Memory (EPROM), and flash memory, a volatile memory element such as Random Access Memory (RAM), or a storage device such as hard disk or optical disk.

The display 120 displays various screens. For example, the display 120 may display a broadcast program and display a channel list and information regarding a channel analysis model used for generating the channel list.

To do so, the display 120 may be implemented as Liquid Crystal Display Panel (LCD), Organic Light Emitting Diodes (OLED), or the like, but is not limited thereto.

The processor 130 may include various processing circuitry and controls overall operations of the display apparatus 100.

The processor 130 may control the storage 110 to store information regarding a broadcast program viewed by a user through the display apparatus 100 as viewing history information.

For example, the processor 130 may store in the storage 110 channel information regarding a broadcast program provided by the display apparatus 100, a viewing time and a viewing count whenever the user turns of the display apparatus 100 or switch channels, Further, the processor 130 may update the viewing history information pre-stored in the storage 110.

For example, if the user turns on the display apparatus 100 or switches a channel while viewing history information is stored in the storage 110, the processor 130 may update the pre-stored viewing history information by adding information regarding a channel, a viewing time and a viewing count regarding a broadcast program displayed on the display apparatus 100 in the pre-stored viewing history information.

Further, the processor 130 may generate a channel list including information regarding a broadcast program that the user is expected to watch at a time when a predetermined event occurs in the display apparatus 100 using viewing history information and display the channel list through the display 120.

The time when a predetermined event occurs may include the time when the display apparatus 100 is turned on.

For example, the processor 130 determines a channel analysis model for generating a channel list among a plurality of channel analysis models based on viewing history information related to the time when a predetermined event occurs.

To do so, the processor 130 may calculate (determine) accuracy of each of the plurality of channel analysis models using viewing history information related to the time when a predetermined event occurs in the display apparatus 100.

For example, if a predetermined event occurs, the processor 130 may calculate (determine) accuracy of each channel analysis model regarding viewing history information at a time when the predetermined event occurs by applying viewing history information to each channel analysis model and may determine a channel analysis model having the highest accuracy relatively as a channel analysis model for generating a channel list.

Hereinafter, the method for calculating (determining) accuracy of each channel analysis model by the processor 130 will be described in greater detail.

The channel analysis model may determine viewing history information related to the time when a predetermined event occurs based on viewing history information.

For example, the MRU model may determine a broadcast program viewed by a user recently with reference to the time when a predetermined event occurs in the display apparatus 100, the MFU model may determine a broadcast program viewed by the user for a relatively long period of time with reference to the time when a predetermined event occurs in the display apparatus 100, and the DATE model may determine a broadcast program viewed by the user at least one of the time, the day and the time and day corresponding to the time when a predetermined event occurs in the display apparatus 100. In addition, the MIX model may consist of at least two models among the MRU model, the MFU model and the DATE model.

A channel analysis model may propose a list of channels which are expected to be viewed by the user at a time when a predetermined event occurs in the display apparatus 100 using the determined viewing history information.

For example, the MRU model may propose a channel list in which the broadcast programs viewed by the user recently are listed sequentially.

For example, if the user has recently watched broadcast programs in the order of channel 5, channel 11, channel 4, channel 7, channel 8, and channel 10, the display apparatus 100 may propose a channel list in which channels are listed in the order of channel 10, channel 8, channel 7, channel 4, channel 11, and channel 5 at a time when the display apparatus 100 is turned on.

In addition, the MRU model may propose a channel list in which the broadcast programs viewed by the user for a long period of time are listed sequentially.

For example, if the user has recently watched channel 7 for 60 hours, channel 8 for 55 hours, channel 10 for 45 hours, channel 4 for 35 hours, channel 11 for 10 hours, and channel 5 for 5 hours, the display apparatus 100 may propose a channel list in which the channels are listed in the order of channel 7, channel 8, channel 10, channel 11, and channel 5 at a time when the display apparatus 100 is turned on.

In addition, the DATE model may propose a list in which broadcast programs with hight weights among broadcast programs that the user has watched at a time, a day or time and day corresponding to the time when a predetermined event occurs in the display apparatus 100 are listed in order.

A method of calculating (determining) a weight of a broadcast program viewed by a user in the DATE model will be described.

For example, the DATE model may set a day rule weight, a time rule weight, and a time and day rule weight in order to calculate a weight of a broadcast program viewed by the user.

For example, the day rule weight may be set to 3, the time rule weight may be set to 4, and the time and day rule weight may be set to 7.

The DATE model may calculate a weight for each broadcast program by applying a rule weight to viewing history information related to the time when a predetermined event occurs in the display apparatus 100.

For example, we may suppose that the user watches channel 56 at 9:00 pm on Friday night for 30 minutes, channel 55 at 10:00 pm on Friday night for 30 minutes, channel, channel 57 at 9:00 pm on Saturday night for 40 minutes, and the user turns on the display apparatus 100 at 9:00 pm on Friday next week.

In this example, as for channel 55, since the day on which channel 55 is viewed and the day on which the display apparatus 100 is turned on are both Friday, the DATE model may apply only the day rule weight to calculate the weight of channel 55 as 90 by multiplying the user's viewing time of 30 minutes by the day rule weight of 3.

As for channel 56, since the day and time that channel 56 is viewed is Friday, 9:00 pm which is the same as the day and time when the display apparatus 100 is turned on, the DATE model may apply the day rule weight, the time rule weight and the day and time rule weight to calculate the weight of 420 by adding the value obtained by multiplying the user's viewing time of 30 minutes by the day rule weight of 3, the value obtained by multiplying the user's viewing time of 30 minutes by the time rule weight 4 and the value obtained by multiplying the user's viewing time of 30 minutes by the day and time rule weight of 7.

In addition, as for channel 57, since the time when channel 57 is viewed and the time when the display apparatus 100 is turned on is both 10:00 pm, that is, only the time is the same, the DATE model may apply only the time rule weight to calculate the weight of 160 by multiplying the user's viewing time of 40 minutes by the time rule weight of 4. Accordingly, the DATE model may propose a channel list in which channel 56, channel 57 and channel 55 are listed in the order of their weights.

Meanwhile, the MIX model may consist of at least two models among the MRU model, the MFU model and the DATE model.

For example, in the above example embodiment regarding the MRU model and the DATE model, the MIX model may propose a channel list in which channels suggested by the MRU model and the DATE model, that is, channel 56, channel 57, channel 55, channel 7, channel 8, and channel 10, are listed in order.

The processor 130 may calculate (determine) accuracy of each channel analysis model based on viewing history information which is determined for each channel analysis model.

For example, the processor 130 may determine the accuracy of each channel analysis model based on a matching degree between a channel list proposed by each channel analysis model before a predetermined event occurs in the display apparatus 100 and a channel list proposed by each channel analysis model at a time when the predetermined event occurs in the display apparatus 100.

For example, if the channel list proposed by the DATE model at a time when the predetermined event occurs in the display apparatus 100 includes channel 1, channel 2 and channel 3, and the channel list proposed by the DATE model before the predetermined event occurs in the display apparatus 100 also includes channel 1, channel 2 and channel 3, the processor 130 may calculate the accuracy as 100% because the channel list proposed before the predetermined event occurs in the display apparatus 100 is consistent with the channel list proposed at a time when the predetermined event occurs in the display apparatus 100.

In addition, according to the above-described example embodiment, if the channel list proposed by the DATE model before the predetermined event occurs in the display apparatus 100 is not completely consistent with the channel list proposed at a time when the predetermined event occurs in the display apparatus 100, the accuracy of the DATE model may be calculated as 0%.

Also, in the above-described example embodiment, if a part of the broadcast programs included in the channel list proposed by the DATE model before the predetermined event occurs in the display device 100 are consistent with only a part of broadcast programs included in the channel list proposed at a time when the predetermined event occurs in the display apparatus 100, the accuracy of the DATE model may be calculated to be more than 0% and less than 100% based on the degree of matching. In other words, when calculating the accuracy of each channel analysis model, if a large number of broadcast programs are matched between the broadcast programs included in the channel list proposed before the predetermined event occurs in the display apparatus 100 and the broadcast programs included in the channel list at a time when the predetermined event occurs in the display apparatus 100, the processor 130 may calculate the accuracy of the channel list including the corresponding broadcast programs to be relatively higher. However, in the method of calculating the accuracy of a channel analysis model, the method of calculating the accuracy according to the number of matching broadcast programs is only one example embodiment, and the accuracy of a channel analysis model can be calculated in various ways.

For example, the processor 130 may set a high weight on a channel list which is proposed recently with reference to the time when a predetermined event occurs in the display apparatus 100 among channel lists proposed before the predetermined event occurs in the display apparatus 100.

Accordingly, after comparing channels lists proposed before the predetermined event occurs in the display apparatus 100 with a channel list proposed at the time when the predetermined event occurs in the display apparatus 100, even if the number of coinciding broadcast programs is large, the accuracy of the corresponding channel analysis model can be calculated relatively low unless the programs are included in a channel list recently proposed. On the other hand, even if the number of coinciding broadcast programs is small, the accuracy of the corresponding channel analysis model can be calculated relatively high if the programs are included in the channel list recently proposed.

Likewise, in the case of the MFU model, the DATE model and the MIX model, the processor 130 may compare the channel list proposed by each model at a time when the predetermined event occurs in the display apparatus 100 with channel lists proposed by each model before the predetermined event occurs in the display apparatus 100 to calculate the accuracy as a percentage based on a matching degree.

Meanwhile, the processor 130 may determine the viewing pattern of a user by limiting the viewing history information to a specific time range.

For example, if it is set that a channel list is generated with reference to viewing history information within the last four weeks, the processor 130 may control each channel analysis model to analyze the viewing pattern of the user based on the viewing history information within the last four weeks and propose a channel list based on the analysis.

The processor 130 may compare the accuracy which is calculated for each channel analysis model and determine a model having relatively high accuracy as a channel analysis model for generating a channel list.

In addition, the processor 130 may control the display 120 to generate a channel list based on the determined channel analysis model and display the channel list.

For example, the processor 130 may configure a channel list so that the channel determined by the channel analysis model having the highest accuracy is included and display the channel list on the display 120.

In addition, the processor 130 may control the display 120 to display information regarding a channel analysis model which is used for generating a channel list.

For example, the processor 130 may display the title of the channel analysis model which is used for generating a channel list along with the channel list in order to indicate which channel analysis model has been used to generate the channel list displayed on the display 120.

Meanwhile, in the above example embodiment, it is described that a channel list corresponding to the time when the display apparatus 100 is turned on is provided. However, the processor 130 may display a channel list including broadcast programs which are expected to be viewed by a user based on viewing history information with reference to not only the time when the display apparatus 100 is turned on but also the time when a channel is switched.

Meanwhile, if the time when a predetermined event occurs is the time when the channel of the display apparatus 100 is switched, the processor 130 may update viewing history information based on a user input when the user input to switch the channel is received.

In other words, the processor 130 may control the storage 110 to store channel information, viewing time and viewing frequency regarding a broadcast program which is displayed on the display apparatus 100 when the user turns on the display apparatus 100 or switches channels as viewing history information.

The processor 130 may re-determine a channel analysis model through the above-described method based on the updated viewing history information and update the channel list using the re-determined channel analysis model.

In other words, when the viewing history information is updated, the accuracy of the corresponding channel analysis model may be changed and thus, when the pre-stored viewing history is updated, the processor 130 may re-determine a channel analysis model using the above method and update the channel list by including channels which are determined through the re-determined analysis model.

Meanwhile, if an input (e.g., a user input) to select a broadcast program displayed on the channel list is received, the processor 130 may change a channel to the channel which provides the selected broadcast program.

For example, if the user touches the channel area of the broadcast program displayed on the channel list or if a user input to select a broadcast program displayed on the channel list through a manipulation on a remote controller is input, the processor 130 may control the display 120 to switch a channel to the selected channel and display the broadcast program reproduced in the switched channel.

Figure 2:
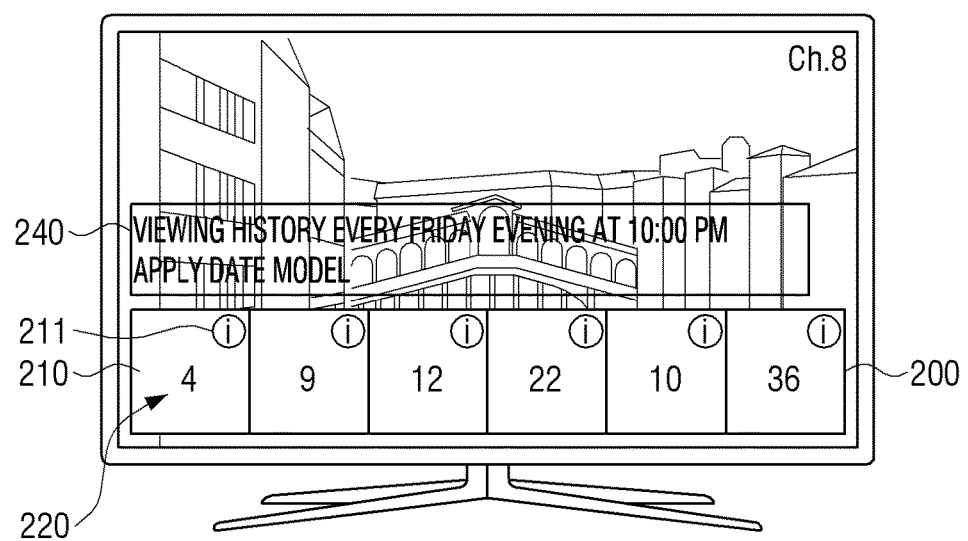
FIG. 2 is a diagram illustrating example content which is displayed in a display according to an example embodiment.

FIG. 2 is a diagram illustrating an example channel list which is provided according to an example embodiment.

For example, as illustrated in FIG. 2, the processor 130 may display a channel list 200 including information regarding channels (e.g., channel 4, channel 9, channel 12, channel 22, channel 10, and channel 36) which are expected to be viewed by the user based on a channel analysis model at a time when the display apparatus 100 is turned on and information 240 regarding the channel analysis model which is used for generating the channel list.

In this case, the channel list may include a thumbnail 210 and a channel number 220 regarding a broadcast program provided through each channel.

Meanwhile, the processor 130 may display a menu 211 for providing additional information regarding each channel in the channel list. Accordingly, if the menu 211 is selected, the processor 130 may display additional information regarding the channel for the selected menu such as the program name, run time, etc. of the broadcast program which is being reproduced in the corresponding channel.

Meanwhile, in FIG. 2, it is described that the channel list 200 includes six channels, but this is only an example. The number of channels included in the channel list may vary in various ways.

In addition, in FIG. 2, it is described that the information 240 regarding a channel analysis model is positioned on the channel list 200, but this is only an example. The information regarding a channel analysis model may be displayed at various locations adjacent to the channel list.

Hereinafter, the method of providing a channel list of broadcast programs which are expected to be viewed by a user at a time when a predetermined event occurs will be described with reference to FIGS. 3 to 7.

Figure 3:
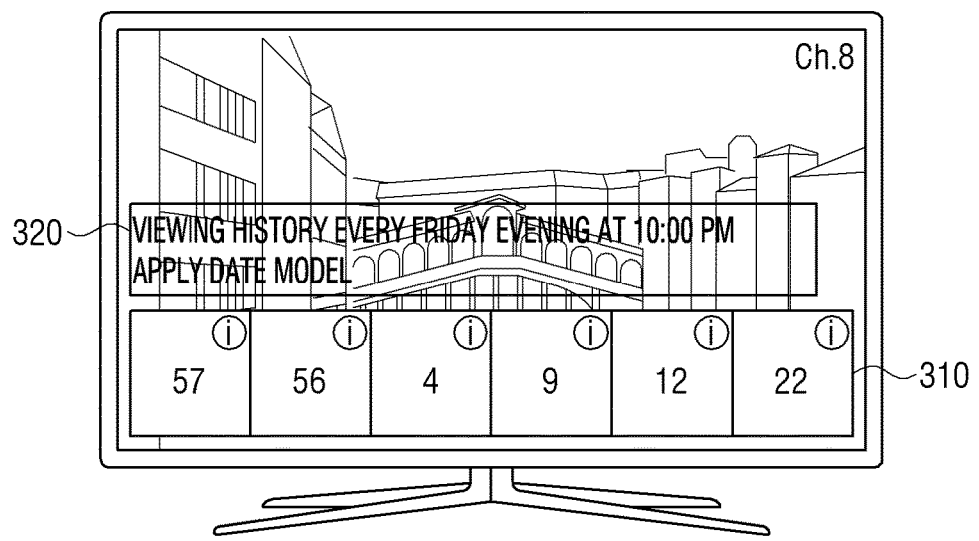
FIGS. 3 and 4 are diagrams illustrating an example method for providing a channel list according to a DATE model among channel analysis models according to an example embodiment.

FIG. 3 is a diagram illustrating an example channel list providing method which is applied to the DATE model from among channel analysis models according to an example embodiment.

For example, suppose that a user watches channel 57 every Friday evening at 10:00 pm.

In this case, if the user turns on the display apparatus 100 at 10:00 pm on Friday evening, the processor 130 determines one of a plurality of channel analysis models based on viewing history information related to 10:00 pm on Friday evening.

Here, the viewing history information related to 10:00 pm on Friday evening may be information on broadcast programs viewed every 10:00 pm on Friday evening, information on broadcast programs viewed every Friday, information on a plurality of broadcast programs which are viewed before the display apparatus 100 is turned on, and information on a plurality of broadcast programs which are viewed many times before the display apparatus 100 is turned on.

The processor 130 calculates accuracy of each of the plurality of channel analysis models based on viewing history information related to Friday night, 10:00 pm. In the above example embodiment, a specific channel is viewed every Friday evening at 10:00 pm and thus, the weight of the DATE model may be calculated relatively higher than other models. Accordingly, the processor 130 may provide a channel list 310 in which channel 57 is located first based on the DATE model.

In addition, channel analysis model information 320 may be displayed on the display 120. In the above example embodiment, the accuracy of the DATE model is the highest at 10:00 pm on Friday evening, and it can be confirmed that the DATE model is applied to the provided channel list 310 according to the viewing history at 10:00 pm on every Friday evening.

Figure 4:
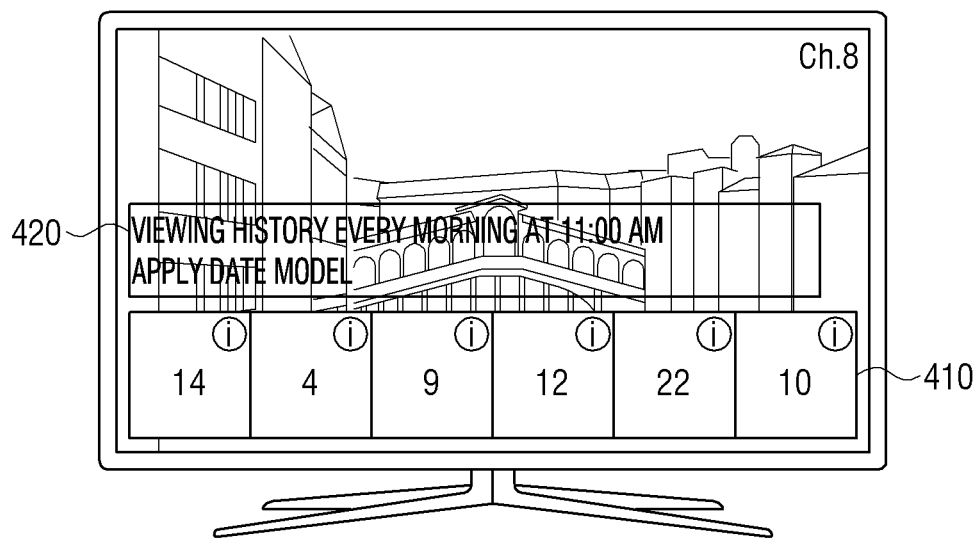

FIG. 4 is a diagram illustrating an example channel list providing method which is applied to the DATE model from among channel analysis models according to an example embodiment.

Hereinafter, the parts overlapping with those described above will not be repeated.

For example, suppose that a user watches channel 14 every morning at 11:00 am.

In this case, if the user turns on the display apparatus 100 at 11:00 am on Thursday morning, the processor 130 calculates accuracy of each of the plurality of channel analysis models based on viewing history information related to Thursday, 11:00 am. In the above example embodiment, a specific channel is viewed every morning at 11:00 am and thus, the accuracy of the DATE model may be calculated relatively higher than other models. Accordingly, the processor 130 may provide a channel list 410 in which channel 14 is located first based on the DATE model.

In addition, channel analysis model information 420 may be displayed on the display 120. In the above example embodiment, the accuracy of the DATE model is the highest at 11:00 am on Thursday morning, and it can be confirmed that the DATE model is applied to the provided channel list according to the viewing history every morning at 11:00 am.

Figure 5:
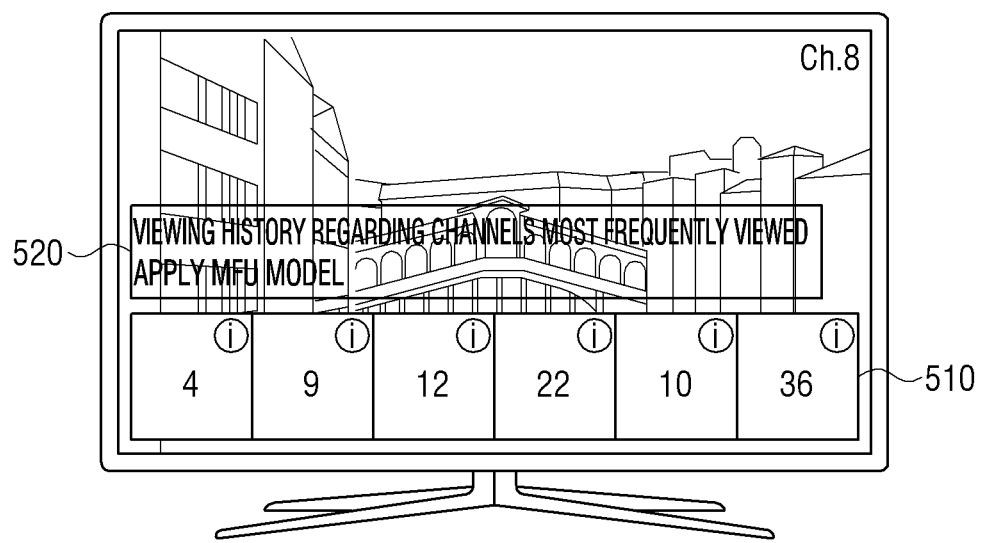
FIG. 5 is a diagram illustrating an example method for providing a channel list according to an MFU model among channel analysis models according to an example embodiment.

FIG. 5 is a diagram illustrating an example method of providing a channel list to which the MFU model is applied from among channel analysis models according to an example embodiment.

For example, suppose that the user has watched channel 4 the most time before turning on the display apparatus 100. In addition, it is assumed that there is no history that the user repeatedly watches a specific channel periodically in the time zone when the display apparatus 100 is turned on.

In this case, the processor 130 calculates accuracy of each of the plurality of channel analysis models based on viewing history information related to the displayed time. In this example embodiment, among the plurality of broadcast programs viewed before the display apparatus is turned on, channel 4 is watched for the longest time, and there is no history that the user has watched a specific channel at a time when the display apparatus 100 is turned on and thus, the weight of the MFU model may be calculated relatively higher than other models. Accordingly, the processor 130 may provide a channel list 510 in which channel 4 is located first based on the MFU model.

In addition, channel analysis model information 520 may be displayed on the display 120. In the above example embodiment, the accuracy of the MFU model is the highest at the time of display, and it can be confirmed that the MFU model is applied to the provided channel list 510 based on the viewing history for channels which are viewed for a long time.

Figure 6:
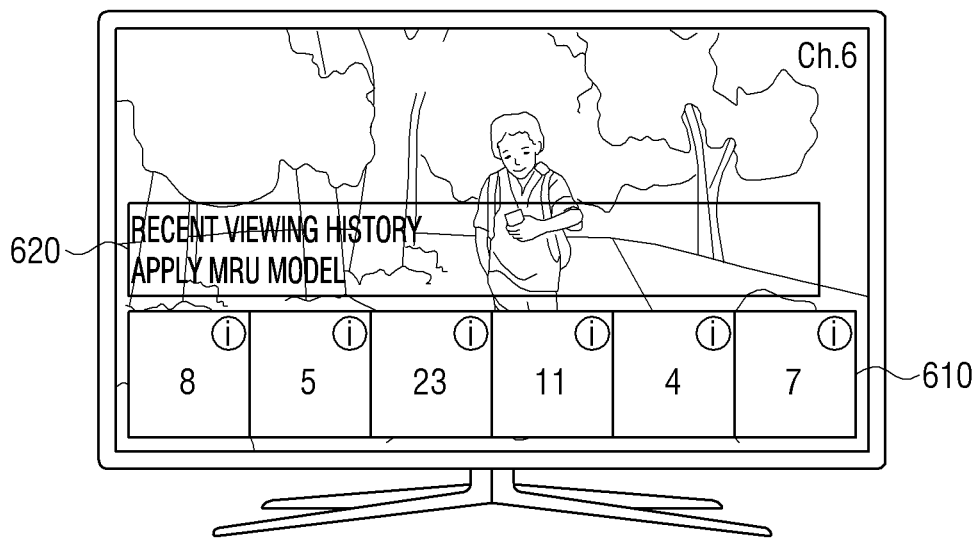
FIG. 6 is a diagram illustrating an example method for providing a channel list according to an MRU model among channel analysis models according to an example embodiment.

FIG. 6 is a diagram illustrating an example method of providing a channel list to which the MRU model is applied from among channel analysis models according to an example embodiment.

For example, suppose that the user inputs a plurality of channel switch commands repeatedly before turning off the display apparatus 100. In addition, it is assumed that there is no history that the user repeatedly watches a specific channel periodically in the time zone when the display apparatus 100 is turned on and there is also no history that the user watches a specific channel for a long time.

In this case, the processor 130 calculates accuracy of each of the plurality of channel analysis models based on viewing history information related to the displayed time. In this example embodiment, a plurality of the same channel switch commands is input repeatedly before the display apparatus 100 is recently turned off and thus, the weight of the MRU model may be calculated relatively higher than other models. Accordingly, the processor 130 may provide a channel list in which the recently viewed channels are located sequentially based on the MRU model.

In addition, channel analysis model information 620 may be displayed on the display 120. In the above example embodiment, the accuracy of the MRU model is the highest at the time of display. and it can be confirmed that the MRU model is applied to the provided channel list 610 based on the recent viewing history.

Figure 7:
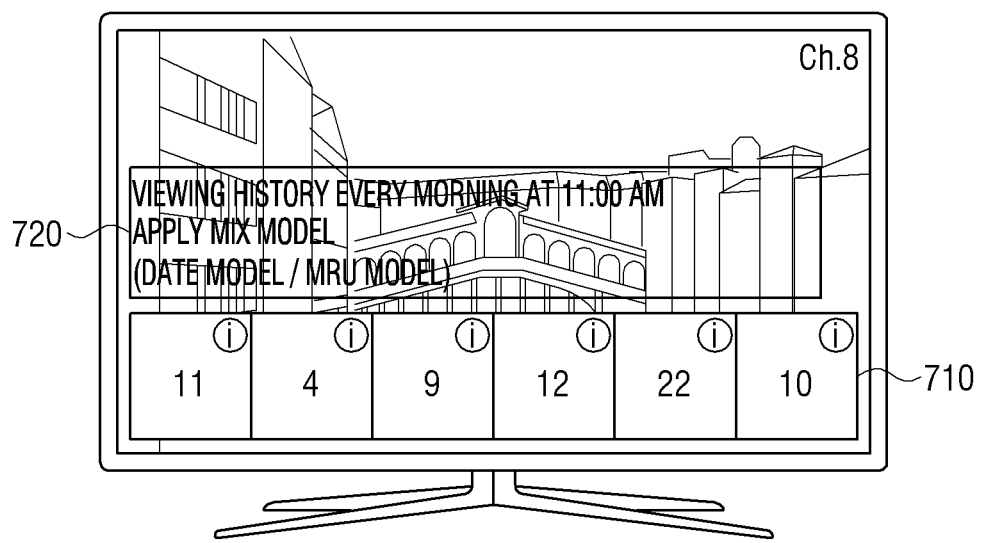
FIG. 7 is a diagram illustrating an example method for providing a channel list according to an MTX model among channel analysis models according to an example embodiment.

FIG. 7 is a diagram illustrating an example channel list providing method which is applied to the MIX model from among channel analysis models according to an example embodiment.

For example, suppose that a user watches channel 14 every morning at 11:00 am this week. In addition, suppose that the user inputs a plurality of channel switch commands repeatedly before recently turning on the display apparatus 100.

In this case, the processor 130 calculates accuracy of each of the plurality of channel analysis models based on viewing history information related to Thursday, 11:00 am. In this example embodiment, a specific channel is viewed every morning at 11:00 am and a plurality of channel switch commands are input repeatedly before the display apparatus 100 is recently turned on, the weight of the MIX model consisting of the DATE model and the MRU model may be calculated relatively higher than other models. Accordingly, the processor 130 may provide a channel list 710 in which channel 11 and recently viewed channels, channel 4, channel 9, channel 12, channel 22 and channel 10 are listed sequentially based on the MIX model including the DATE model and the MRU model.

In addition, channel analysis model information 720 may be displayed on the display 120. In the above example embodiment, the accuracy of the MIX model is the highest at 11:00 am on Thursday, and it can be confirmed that the MIX model including the DATE model and the MRU model is applied to the provided channel list 710.

Figure 8:
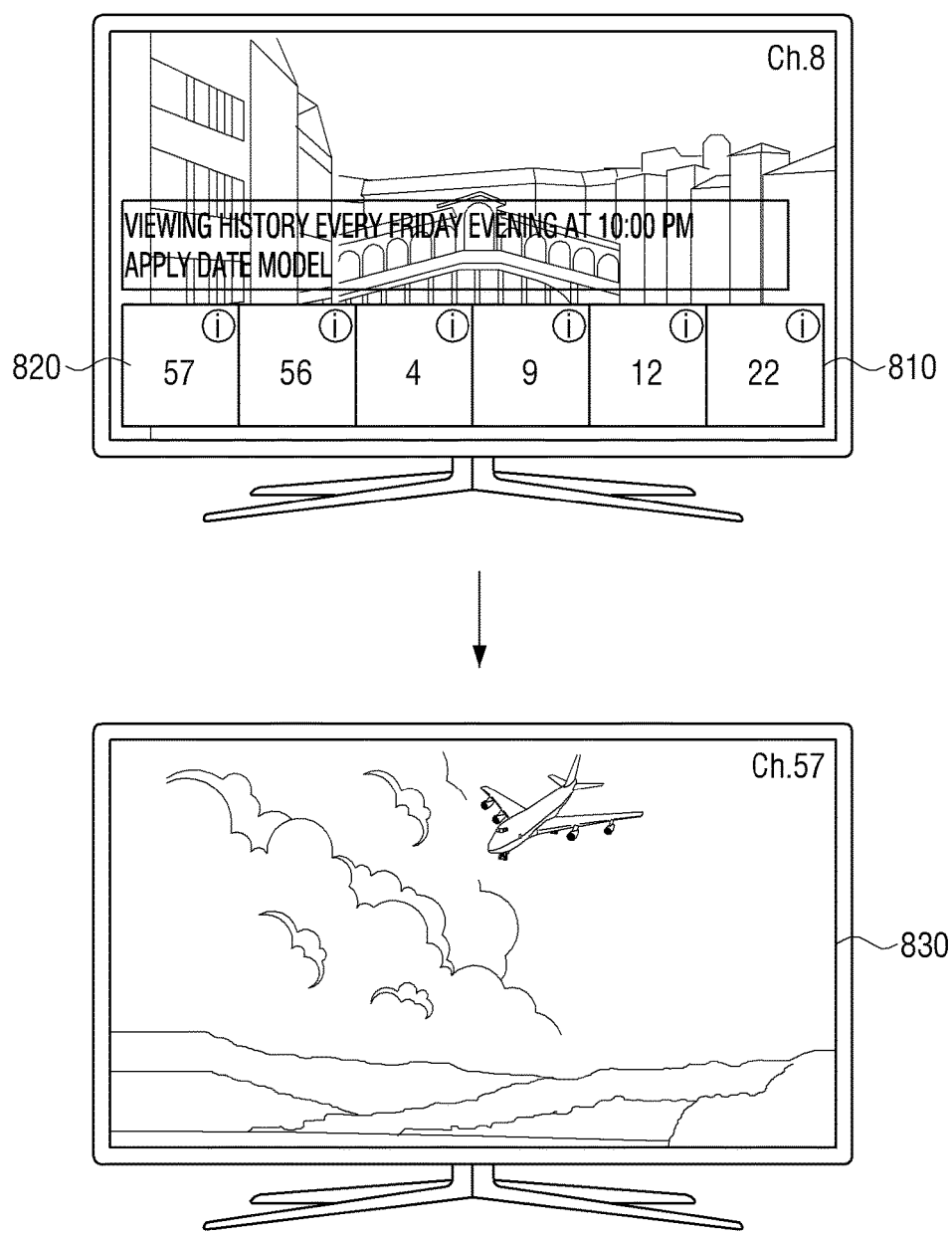
FIG. 8 is a diagram illustrating an example channel switch method based on a channel list according to an example embodiment.

FIG. 8 is a diagram illustrating an example in which when a user input to select a broadcast program displayed on a channel list is received, a channel is switched to the channel which provides the selected broadcast program according to an example embodiment of the present disclosure.

For example, if a user inputs a user command to select a channel area 820 of a first item provided on a channel list 810, the display apparatus 100 may switch a channel to channel 57 displayed on the first item and display a broadcast program 830 provided by channel 57.

Figure 9:
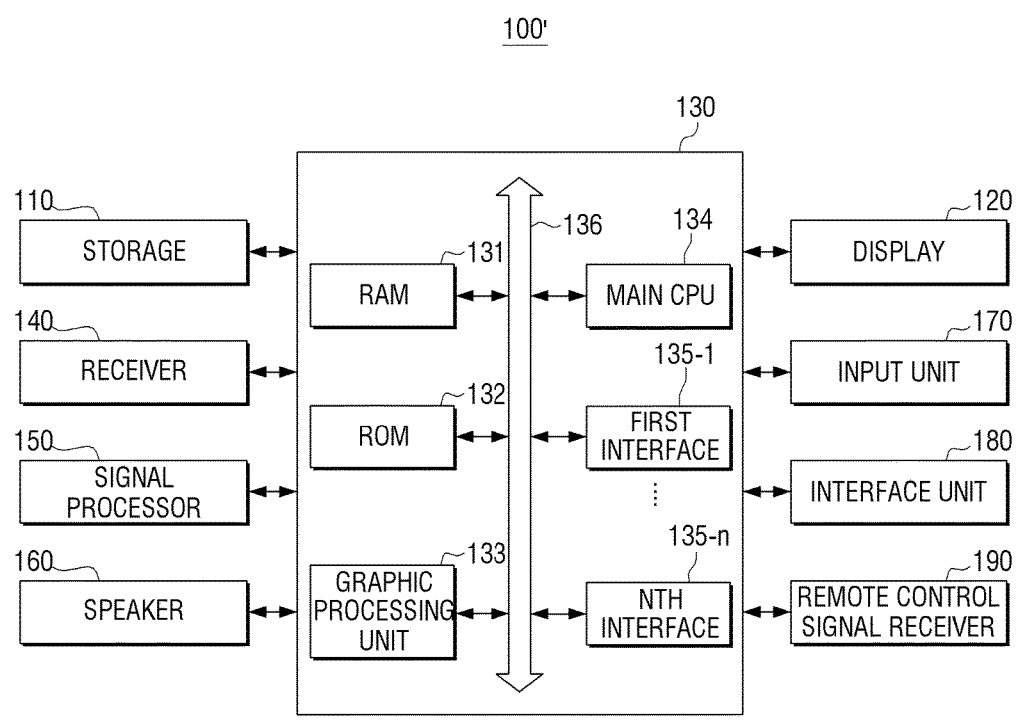
FIG. 9 is a block diagram illustrating an example configuration of a display apparatus according to an example embodiment.

FIG. 9 is a block diagram illustrating an example configuration of a display apparatus according to another example embodiment.

As illustrated in FIG. 9, a display apparatus 100' according to another example embodiment includes a storage 110, a display 120, a processor (e.g., including processing circuitry) 130, a receiver (e.g., including receiving circuitry) 140, a signal processor 150, a speaker 160, an input unit (e.g., including input circuitry) 170, an interface unit (e.g., including interface circuitry) 180 and a remote control signal receiver (e.g., including signal receiving circuitry) 190. Hereinafter, a description which is overlapped with the description of FIG. 1 will not be repeated.

The storage 110 may store channel analysis models. Here, the channel analysis models may include the MRU model, the MFU model, the DATE model, the MIX model, and the like.

At least a part of the channel analysis models may be embodied as software, a program and so on, and may be implemented (for example, execution) by the processor 130.

In addition, the storage 110 may store an operating system to control overall operations of the elements of the display apparatus 100' and commands or data related to the elements of the electronic apparatus 100. Accordingly, the processor 130 may include various processing circuitry and control a plurality of hardware or software elements of the display apparatus 100' using various commands or data stored in the storage 110, load commands or data received from at least one of other elements on a volatile memory, process the commends or data, and store various data in a non-volatile memory.

The processor 130 is a component include various processing circuitry that is configured to control the overall operations of the display apparatus 100'.

For example, the processor 130 includes a RAM 131, a ROM 132, a CPU 134, first to nth interfaces 135-1 to 135-n, and a bus 136. Here, the RAM 131, the ROM 132, the graphic processing unit 133, the main CPU 134, the first to nth interfaces 135-1 to 135-n, and the like may be connected to each other through the bus 136.

The first to nth interfaces 135-1~135-n are connected to the various elements mentioned above. One of the interfaces may be a network interface connected to an external device through a network.

The main CPU 134 accesses the storage 110 to perform booting by using an O/S stored in the storage 110. In addition, the main CPU 134 may perform various operations using a variety of programs, contents, data, and the like stored in the storage 110.

The RAM 131 stores a set of commands for system booting. If a turn-on command is input and power is provided, the main CPU 134 may copy an operating system (O/S) stored in the storage 110, in the RAM 131, according to a command stored in the ROM 132, and execute the O/S so that a system is booted. When the booting is completed, the main CPU 134 copies various programs stored in the storage 110 to the RAM 131, and executes the programs copied in the RAM 131 to perform various operations.

The receiver 140 may include various circuitry to receive a broadcast content (or a broadcast signal). The broadcast content may include an image, an audio, and additional data (for example, Electronic Program Guide (EPG)), and the receiver 140 may receive the broadcast content from various sources such as terrestrial broadcasting, cable broadcasting, satellite broadcasting, Internet broadcasting, etc.

For example, the receiver 140 may include various receiver circuitry, such as, for example, and without limitation, a tuner (not shown), a demodulator (not shown), an equalizer (not shown), or the like, to receive a broadcast content transmitted from a broadcasting station.

The signal processor 150 may include various signal processing circuitry and performs signal processing with respect to a content received through the receiver 140. Specifically, the signal processor 150 may perform operations such as decoding, scaling, frame rate conversion, etc. with respect to an image which composes a content, and may perform signal processing in a form that can be output from the display 120. Further, the signal processor 150 may perform signal processing such as decoding with respect to an audio which composes a content and perform signal processing in a form that can be output from the speaker 160.

Accordingly, the display 120 may display an image output from the signal processor 150, and the speaker 160 may output an audio output from the signal processor 150.

The input unit 170 may include various input circuitry that receives various user commands. The processor 130 may perform a function corresponding to the user command input through the input unit 170.

For example, the input unit 170 may receive a user command to perform the operations of turning on, switching channels, controlling volume, and the like, and the processor 130 may turn on the display apparatus 100', switch channels, control volume, and the like according to the input user command. In addition, the input unit 170 may receive a user command to select a broadcast program on a channel list and in this case, the processor 130 may display the corresponding broadcast program according to the input user command.

To achieve this, the input unit 170 may include various input circuitry, such as, for example, and without limitation, an input panel. The input panel may implemented using various input circuitry, such as, for example, and without limitation, a touch pad, a key pad provided with various function keys, number keys, special keys, character keys, or the like, or a touch screen.

The interface unit 180 may include various circuitry that connects various other electronic apparatuses (not shown) and the display apparatus 100'. In this case, the processor 130 may transmit data which is pre-stored in the display apparatus 100' to another electronic apparatus (not shown) through the interface unit 180, or receive data from an electronic apparatus (not shown).

For example, the interface unit 180 may include various interface circuitry, such as, for example, and without limitation, at least one of a High-Definition Multimedia Interface (HDMI) input terminal, a component input terminal, a PC input terminal, and a USB input terminal, or the like.

The remote control signal receiver 190 may include various circuitry that receives a remote control signal input from a remote controller (not shown).

In this case, the remote control signal receiver 190 may receive various remote control signals. For example, the remote control signal receiver 190 may receive a remote control signal to perform the operations of turning on, switching channels, controlling volume, and the like, and the processor 130 may turn on the display apparatus 100', switch channels, control volume, and the like according to the received remote control signal. In addition, the remote control signal receiver 190 may receive a control signal to select a broadcast program on a channel list and in this case, the processor 130 may display the corresponding broadcast program according to the received control signal.

Figure 10:
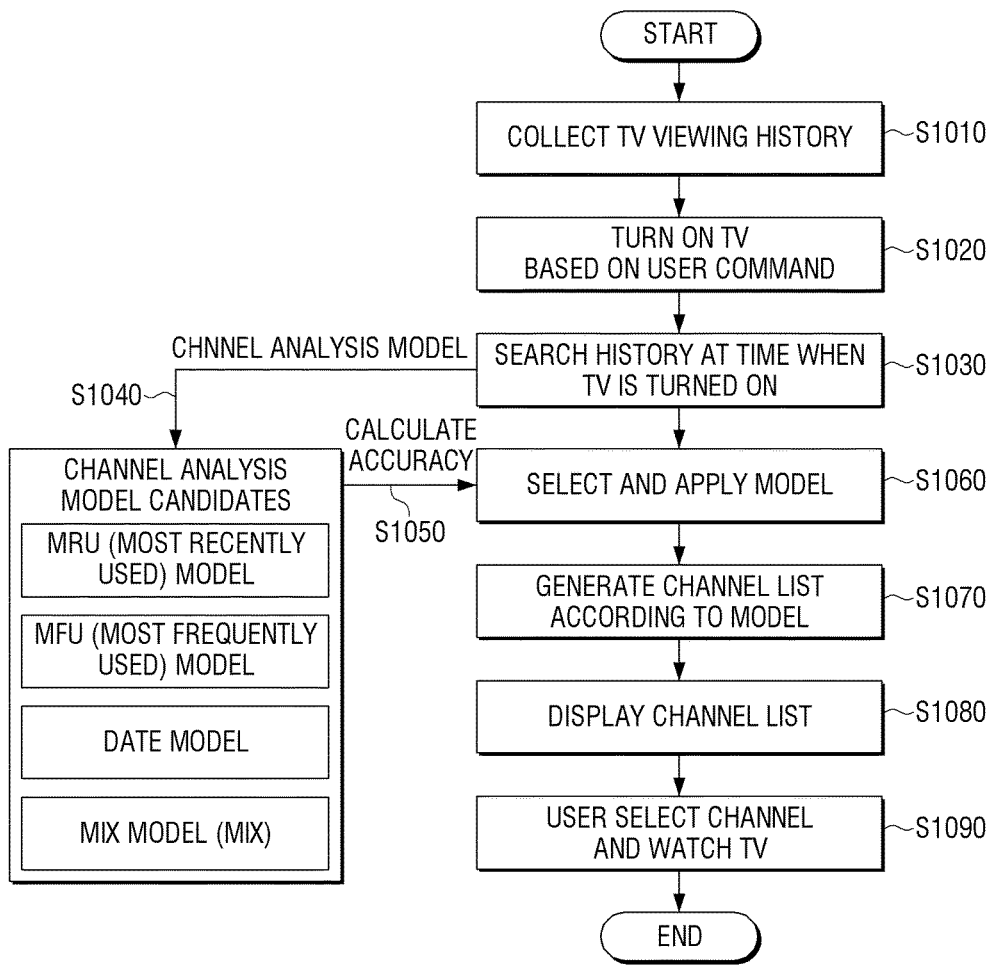
FIG. 10 is a flowchart illustrating an example method for providing a channel list according to an example embodiment.

FIG. 10 is a flowchart illustrating an example method of providing a channel list according to an example embodiment. In FIG. 10, a case where the display apparatus 100 is implemented as a TV will be described as an example, but the example embodiment is not limited thereto.

A TV 100 collects viewing history information (S1010). The TV 100 is turned on based on a user command to turn on the TV 100 (S1030), and the TV 100 searches a pre-stored viewing history at a time when the TV 100 is turned on (S1030).

The TV 100 applies the viewing history at the time of turning on the TV 100 to each channel analysis model (S1040) and calculates accuracy of each channel analysis model (S1050). Subsequently, the TV 100 compares the calculated accuracy of each model, select a model with the highest accuracy, determine a channel which is expected to be viewed by a user at a time when the user turns of the TV 100 using the selected model, and generate a channel list (S1060, S1070).

The TV 100 may display the channel list (S1080) and based on a user command to select a channel in the channel list, switch a channel to the selected channel (S1090).

Figure 11:
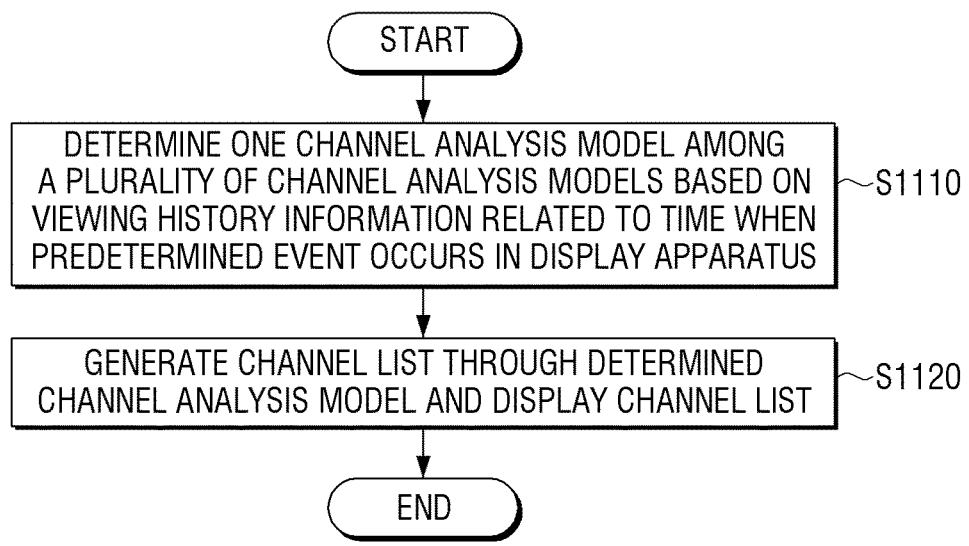
FIG. 11 is a flowchart illustrating an example method for providing a channel list according to an example embodiment.

FIG. 11 is a flowchart illustrating an example method of providing a channel list of a display apparatus according to an example embodiment.

A channel analysis model from among a plurality of channel analysis models is determined based on viewing history information related to the time when a predetermined event occurs in the display apparatus 100 (S1110).

Here, the time when a predetermined event occurs may include at least one of the time when the display apparatus 100 is turned on and the time when the channel of the display apparatus 100 is switched.

A channel list is generated and displayed through the determined channel analysis model (S1120).

In this case, the channel list may include information regarding a broadcast program which is expected to be viewed by a user at a time when a predetermined event occurs in the display apparatus 100.

Meanwhile, the step of S1110 may include calculating accuracy of each of a plurality of channel analysis models using viewing history information related to the time when a predetermined event occurs in the display apparatus 100 and determining a channel analysis model having the highest accuracy from among the plurality of channel analysis models as a channel analysis model for generating a channel list.

Here, the MRU model may determine a broadcast program viewed by a user recently with reference to the time when a predetermined event occurs in the display apparatus 100, the MFU model may determine a broadcast program viewed by the user for a relatively long period of time with reference to the time when a predetermined event occurs in the display apparatus 100, and the DATE model may determine a broadcast program viewed by the user at least one of the time, the day and the time and day corresponding to the time when a predetermined event occurs in the display apparatus 100. In addition, the MIX model may consist of at least two models out of the MRU model, the MFU model and the DATE model.

Meanwhile, if a user input to switch a channel is received, the viewing history information may be updated based on the received user input, a channel analysis model may be determined again based on the updated viewing history information, and a channel list may be updated based on the re-determined channel analysis model.

In addition, the step of S1120 may include displaying information regarding the channel analysis model which is used to generate a channel list.

If a user input to select a broadcast program displayed in the channel list is received, a channel may be switched to a channel which provides the selected broadcast program.

The above-described method of providing a channel list according to an example embodiment may be implemented as a program for execution on a computer and stored in a computer-readable recording medium. Examples of the computer readable recording medium include a ROM, a RAM, a CD-ROM, a magnetic tape, a floppy disk, an optical data storage device, and the like, and may also be implemented in the form of a carrier wave (for example, transmission over the Internet).

The recording medium readable by a computer may be distributed in computer systems that are connected over a network so that a code readable by a computer may be stored and executed in a dispersion method. Functional programs, code and code segments for implementing the above method can be easily inferred by programmers of the art to which the present disclosure pertains.

Although various example embodiments have been illustrated and described, it will be appreciated by those skilled in the art that changes may be made to these example embodiments without departing from the principles and spirit of the present disclosure. Accordingly, the scope of the present disclosure is not limited to the described example embodiments, but is defined by the appended claims as well as equivalents thereto.

What is claimed is:

1. A display apparatus, comprising:
   a display;
   a storage configured to store a viewing history information regarding broadcasting programs displayed through the display; and
   a processor configured to:
   obtain a plurality of channel lists, wherein the plurality of channel lists are generated by a plurality of channel analysis models based on a viewing history information related to a time when a predetermined event occurs in the display apparatus among the stored viewing history information,
   identify accuracy of the plurality of channel analysis models based on comparing the plurality of channel lists with a plurality of channel lists which are generated by the plurality of channel analysis models before the predetermined event occurs,
   identify one channel analysis model from among the plurality of channel analysis models based on the identified accuracy of the plurality of channel analysis models, and
   display a channel list generated by the identified channel analysis model on the display.

2. The apparatus as claimed in claim 1, wherein the processor is configured to identify an accuracy of each of the plurality of channel analysis models using viewing history information related to a time when a predetermined event occurs in the display apparatus, and to identify a channel analysis model having a highest accuracy from among the plurality of channel analysis models as a channel analysis model for generating the channel list.

3. The apparatus as claimed in claim 2, wherein the processor is configured to identify accuracy based on a degree of matching between a channel list generated by the channel analysis model before the predetermined event occurs in the display apparatus and a channel list generated by the channel analysis model at a time when the predetermined event occurs in the display apparatus.

4. The apparatus as claimed in claim 1, wherein the plurality of channel analysis models includes: a Most Recently Use (MRU) model configured to identify a broadcast program most recently viewed with reference to a time when a predetermined event occurs in the display apparatus, a Most Frequently Use (MFU) model configured to identify a broadcast program most frequently viewed with reference to a time when a predetermined event occurs in the display apparatus, a DATE model configured to identify a broadcast program viewed on at least one of a time, a day and a time and a day corresponding to a time when a predetermined event occurs in the display apparatus, and a MIX model including at least two of the MRU model, the MFU model and the DATE model.

5. The apparatus as claimed in claim 4, wherein the MRU model is configured to generate a channel list in which channels identified to be most recently viewed broadcast programs are listed sequentially, the MFU model is configured to generate a channel list in which channels identified to be most frequently viewed broadcast programs are listed sequentially, the DATE model is configured to generate a channel list which is generated by applying a day rule weight, a time rule weight and a day and time rule weight to channels identified to be viewed on at least one of: a time, a day and a time and a day corresponding to a time when a predetermined event occurs in the display apparatus, and to list the channels in descending order of weights, and the MIX model is configured to generate a channel list based on at least two models from among the MRU model, the MFU model and the DATE model.

6. The apparatus as claimed in claim 1, wherein the processor, in response to an input for channel switch being received, is configured to update the viewing history information based on the received input, to identify the channel analysis model again based on the updated viewing history information, and to update the channel list based on the re-identified channel analysis model.

7. The apparatus as claimed in claim 1, wherein the processor is configured to cause the display to display information regarding a channel analysis model used for generating the channel list.

8. The apparatus as claimed in claim 1, wherein the time at which the predetermined event occurs includes at least one of: a time when the display apparatus is turned on and a time when a channel of the display apparatus is switched.

9. The apparatus as claimed in claim 1, wherein the processor, in response to an input for selecting a broadcast program which is displayed on the channel list being received, is configured to perform a channel switch to a channel which provides the selected broadcast program.

10. A method for providing a channel list of a display apparatus, the method comprising:
obtaining a plurality of channel lists, wherein the plurality of channel lists are generated by a plurality of channel analysis models based on a viewing history information related to a time when a predetermined event occurs in the display apparatus among stored viewing history information;
identifying accuracy of the plurality of channel analysis models based on comparing the plurality of channel lists with a plurality of channel lists which are generated by the plurality of channel analysis models before the predetermined event occurs;
identifying one channel analysis model from among the plurality of channel analysis models based on the identified accuracy of the plurality of channel analysis models; and
displaying a channel list generated by the identified channel analysis model.

11. The method as claimed in claim 10, wherein the determining a channel analysis model further comprises:
identifying an accuracy of each of the plurality of channel analysis models using viewing history information related to a time when a predetermined event occurs in the display apparatus; and
identifying a channel analysis model having a highest accuracy determined from among the plurality of channel analysis models as a channel analysis model for generating the channel list.

12. The method as claimed in claim 11, wherein the identifying accuracy comprises identifying accuracy based on a degree of matching between a channel list generated by the channel analysis model before the predetermined event occurs in the display apparatus and a channel list generated by the channel analysis model at a time when the predetermined event occurs in the display apparatus.

13. The method as claimed in claim 10, wherein the plurality of channel analysis models includes a Most Recently Use (MRU) model which identifies a broadcast program most recently viewed with reference to a time when a predetermined event occurs in the display apparatus, a Most Frequently Use (MFU) model which identifies a broadcast program most frequently viewed with reference to a time when a predetermined event occurs in the display apparatus, a DATE model which identifies a broadcast program viewed on at least one of: a time, a day and a time and a day corresponding to a time when a predetermined event occurs in the display apparatus, and a MIX model including at least two of the MRU model, the MFU model and the DATE model.

14. The method as claimed in claim 13, wherein the MRU model generates a channel list in which channels identified to be most recently viewed broadcast programs are listed sequentially, the MFU model generates a channel list in which channels identified to be most frequently viewed broadcast programs are listed sequentially, the DATE model generates a channel list which is generated by applying a day rule weight, a time rule weight and a day and time rule weight to channels identified to be viewed by the user at least one of: a time, a day and a time and a day corresponding to a time when a predetermined event occurs in the display apparatus and listing the channels in descending order of weights, and the MIX model generates a channel list based on at least two models among the MRU model, the MFU model and the DATE model.

15. The method as claimed in claim 10, further comprising:
in response to an input for channel switch being received, updating the viewing history information based on the input;
identifying the channel analysis model again based on the updated viewing history information; and updating the channel list based on the re-identified channel analysis model.

16. The method as claimed in claim 10, wherein the displaying further comprises:
   displaying information regarding a channel analysis model used for generating the channel list through the display.

17. The method as claimed in claim 10, wherein the time at which the predetermined event occurs includes at least one of: a time when the display apparatus is turned on and a time when a channel of the display apparatus is switched.

18. The method as claimed in claim 10, further comprising:
   in response to an input for selecting a broadcast program which is displayed on the channel list being received, performing a channel switch to a channel which provides the selected broadcast program.

* * * * *